May 6, 1947.  E. W. BALDWIN  2,420,219

CUTTER BAR CONTROL

Filed July 8, 1944

INVENTOR.
Ernest W. Baldwin
BY
ATTORNEY.

Patented May 6, 1947

2,420,219

UNITED STATES PATENT OFFICE 2,420,219

CUTTER BAR CONTROL

Ernest W. Baldwin, Ottawa, Kans., assignor, by mesne assignments, to Baldwin-Ward Manufacturing Co., Inc., Ottawa, Kans., a corporation of Kansas Application July 8, 1944, Serial No. 543,982

2 Claims. (Cl. 56—208)

The present invention pertains to attachments for combines or like implements, and has for a primary aim the provision of a cutter bar control, capable of changing the position of that part of the implement as the work progresses and at the will of the operator.

One of the primary objects of this invention is to provide a cutter bar control for combines or like implements, that is electrically driven, specially mounted for bodily swinging movement as the structure for raising and lowering the cutter bar is operated, and remote controls adjacent to the driver of the combine, for selectively causing a reversible motor to travel in the selected direction.

Another aim of this invention is to provide a control of the aforementioned character, that may be built integrally with the implement when first assembled, or added thereto as an accessory after the implement has been in service for a period of time—the latter being accomplished with a minimum amount of work and without altering the character of the implement.

Other objects of the invention include the unique manner of forming the parts embodying the invention, with special regard to their efficiency, ruggedness and inexpensive manufacture, the specific details whereof will become apparent during the course of the following specification, referring to the accompanying drawing, wherein.

Figure 1:
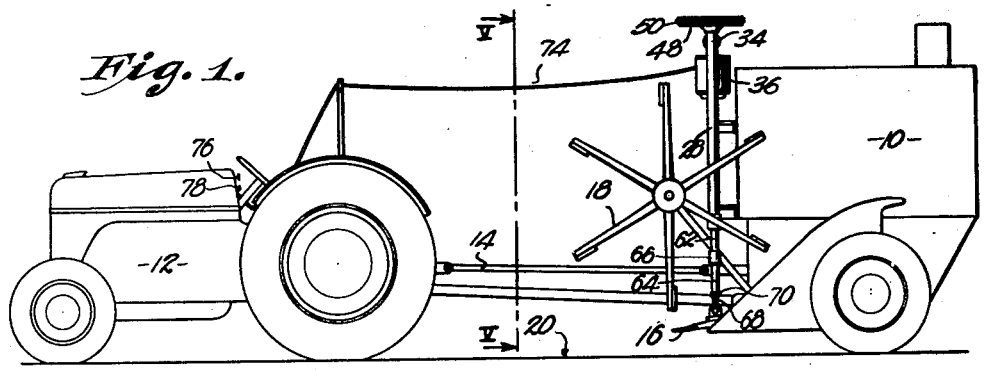
Fig. 1 is a side elevational view of a tractor drawn combine, having the cutter bar control made in accordance with this invention associated therewith.
Figure 2:
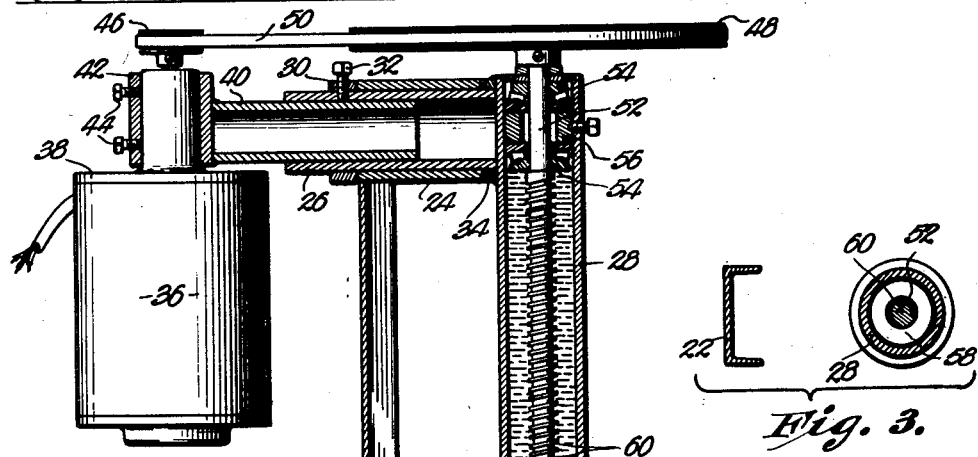
Fig. 2 is an enlarged condensed vertical longitudinal sectional view through the attachment, entirely removed from its operative position.
Figure 3:
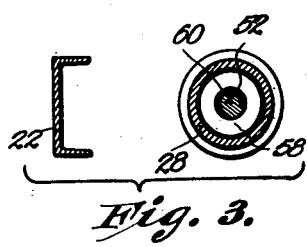
Fig. 3 is a sectional view taken on line III—III of Fig. 2.
Figure 5:
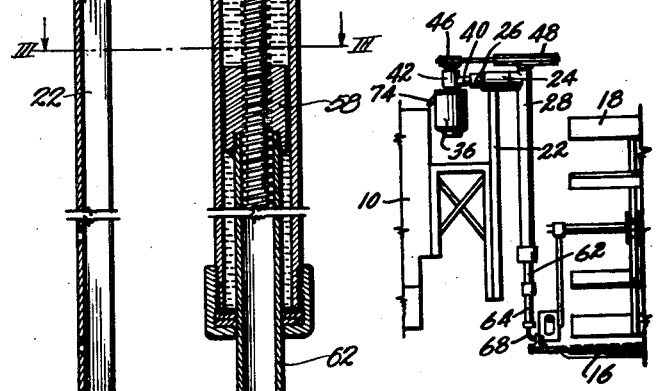
Fig. 5 is a fragmentary cross sectional view taken on line V—V of Fig. 1.
Figure 4:
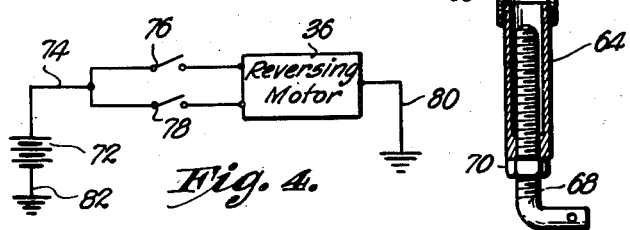
Fig. 4 is a diagrammatical view illustrating the manner in which the electric circuit is arranged.

In the drawing, the combine is designated by the numeral 10 while the motivating tractor is indicated at 12. Suitable draw bars 14 are provided as is the conventional practice.

The cutter bar 16 of combine 10 is disposed adjacent to reel 18 and severs the stems of the grain at a desired distance above the bases thereof. It is often times desirable, if not necessary, to raise or lower the cutter bar with respect to the ground surface 20, and it is through the employment of the control about to be described, that such action may occur without stopping the combine or interrupting the harvest in any manner.

The control per se comprises a standard 22 disposed substantially in a vertical position and mounted upon the frame of combine 10 in any suitable fashion. The upper end of standard 22 has a sleeve 24 to form a bearing for the hollow arm 26 integral with depending tube 28. This arm 26 is pivotally journalled in sleeve 24 and maintained against longitudinal movement through the medium of a collar 30 and set screw 32. A spacer 34 lies between the end of sleeve 24 and the outer annular face of tube 28.

A reversible electric motor 36 is supported on standard 22 through the medium of its specially designed head 38 and bracket 40. This bracket 40 includes a sleeve 42 in which a portion of head 38 is disposed when the parts are assembled. Set screws 44 hold motor 36 in position with a relatively small pulley 46 in substantially the same plane as larger pulley 48. A belt 50 passes around pulleys 46 and 48.

Pulley 48 is secured to screw 52 housed within tube 28 and extending longitudinally therealong for a portion of its length. Roller bearings 54 and sleeve 56 secure the upper portion of screw 52 in place.

The internally threaded follower block 58, movably mounted in tube 28 is engaged by threads 60 of screw 52.

A series of three members join block 58 with cutter bar 16. The uppermost member 62 is tubular and receives the free end of screw 52 as the cutter bar and associated members just mentioned, are raised. A tubular link 64 is connected to member 62 by a threaded collar 66 and receives the threaded portion of fixture 68 formed and designed to be attached directly to the cutter bar 16. A lock nut 70 fastens fixture 68 in a set position after adjustment has occurred.

Motor 36 is joined to the battery 72 of tractor 12 through the medium of a conductor, or conductors 74, wherein is interposed switches 76 and 78. These conductors 74 extend to a point adjacent the operator of the implement and either switch 76 or 78 may be closed to actuate the structure just described, to elevate or drop cutter bar 16 to the desired level.

Reversing motor 36 is grounded as at 80, as is battery 72 at 82. For example, when cutter bar 16 is to be raised, switch 76 is closed, motor 36 will travel in a direction to rotate screw 52 to draw follower block 58 upwardly in tube 28.

All of the parts associated with block 58 will rise as will the cutter bar 16, to the desired degree. When the height desired is attained, switch 76 is released and motor 36 remains stationary. When the bar 16 is to be lowered, switch 78 is closed and screw 52 will be rotated in the opposite direction through the medium of pulleys 46 and 48 and belt 50. Follower block 58 will then be lowered as will the members 62, 64, 66, 68 and 70. Thus, cutter bar 16 will drop to the desired degree.

As the cutter bar 16 is raised and lowered, a swinging action is required of all of the aforesaid structure. This pivotal movement is permitted because of the manner in which sleeve 24 on standard 22 swingably supports arm 26 and all the above described component parts of the control.

Belt 50 may be maintained in proper tension by shifting bracket 40 in arm 26 after set screws 32 have been adjusted. Set screws 44 allow vertical shifting of motor 36 to finally arrange belt 50 in operative relation to pulleys 46 and 48.

It is understood that cutter bar controls having characteristics different from those illustrated and described, might be made without departing from the spirit of the invention and scope of the appended claims.

Having thus described the invention, what is claimed as new and desired to be secured by Letters Patent is:

1. A cutter bar control for combines or like implements comprising a pivoted support, a housing forming a part of said support; a screw rotatably mounted in said housing; a follower block threaded onto the screw; a cutter bar pivotally mounted to swing relative to said support; members pivotally interconnecting said block and the cutter bar; a prime mover on the support operably joined to the screw and being operable for rotating the screw in either direction for raising and lowering the block and the cutter bar pivotally connected thereto to and from predetermined positions along their respective paths of travel; and means for pivotally mounting the support and parts carried thereby for bodily swinging movement as the cutter bar is adjusted whereby said housing and cutter bar each are caused to swing in relation to each other to permit a change in the angularity therebetween.

2. A cutter bar control for combines or like implements comprising a pivoted support, a housing forming a part of said support; a screw rotatably mounted in said housing; a follower block threaded onto the screw; a cutter bar pivotally mounted to swing relative to said support; members interconnecting said block and the cutter bar; a prime mover on the support operably joined to the screw and being operable for rotating the screw in either direction for raising and lowering the block and the cutter bar connected thereto to and from predetermined positions along their respective paths of travel; and means for pivotally mounting the support and parts carried thereby for bodily swinging movement as the cutter bar is adjusted, said mounting means comprising a standard adapted to be secured to said implement, a sleeve on the standard, said pivoted support comprising laterally extending arms on the prime mover and the housing respectively, said arms extending into opposite ends of the sleeve to be rotatably mounted therein.

ERNEST W. BALDWIN.

REFERENCES CITED

The following references are of record in the file of this patent:

UNITED STATES PATENTS

| Number | Name | Date |
|---|---|---|
| 1,064,812 | Best | June 17, 1913 |
| 1,948,895 | Welty | Feb. 27, 1934 |
| 2,082,688 | Dekker | June 1, 1937 |
| 2,224,576 | Mutschler | Dec. 10, 1940 |
| 547,215 | Jaimison et al. | Oct. 1, 1895 |
| 1,925,369 | Braasch | Sept. 5, 1933 |
| 1,930,643 | Clausen | Oct. 17, 1933 |
| 2,170,573 | Pierson | Aug. 22, 1939 |
| 1,819,605 | Johnston | Aug. 18, 1931 |